United States Patent [19]

Flinchum

[11] Patent Number: 5,598,595
[45] Date of Patent: Feb. 4, 1997

[54] TRAILER RAMP MECHANISM

[76] Inventor: Harold C. Flinchum, 6980 Garrett Store Rd., Liberty, N.C. 27298

[21] Appl. No.: 553,994

[22] Filed: Nov. 6, 1995

[51] Int. Cl.⁶ .......................... B65G 69/28; B62D 33/03
[52] U.S. Cl. .......................... 14/69.5; 414/537; 296/61
[58] Field of Search .................... 14/69.5, 71.1, 14/71.3; 414/537; 296/57.1, 61; 267/168, 177

[56] References Cited

U.S. PATENT DOCUMENTS

| | | | |
|---|---|---|---|
| 3,756,440 | 9/1973 | Raap et al. | 296/61 X |
| 3,972,428 | 8/1976 | Love, Jr. et al. | 296/61 X |
| 4,657,233 | 4/1987 | Vroom | 296/61 X |
| 5,145,310 | 9/1992 | Calzone | 414/537 |
| 5,536,058 | 7/1996 | Otis | 414/537 X |

*Primary Examiner*—James A. Lisehora

[57] ABSTRACT

A mechanism is provided for attachment to a pivotable ramp of a trailer to assist in the manual lifting and lowering of the ramp. The mechanism allows the tension of a pair of coil springs positioned on a guide rod to be adjusted and a slotted spring stop permits lateral positioning of the ramp to accommodate various wheel bases of the equipment to be loaded.

11 Claims, 3 Drawing Sheets

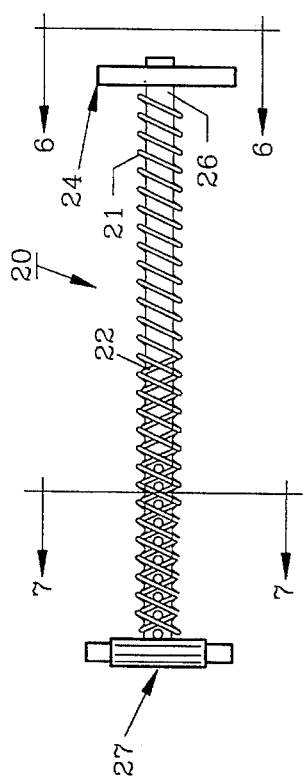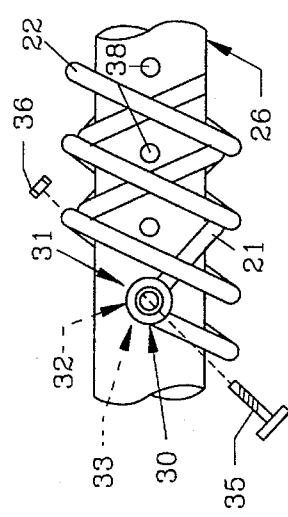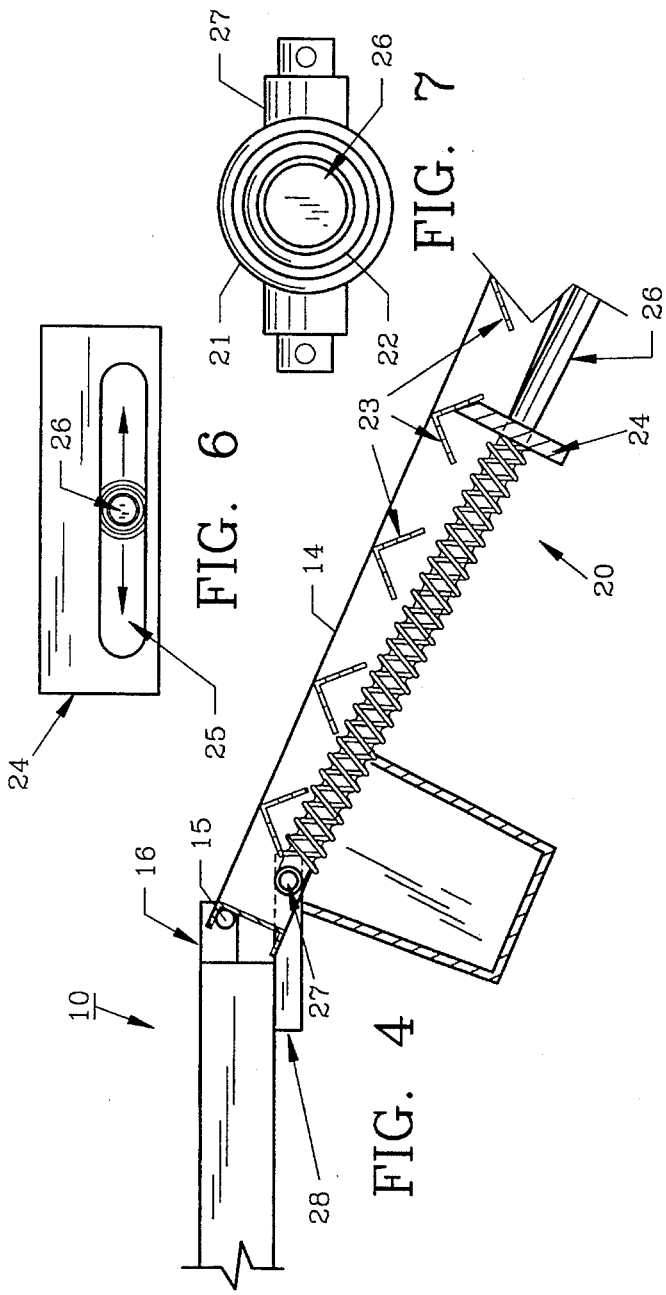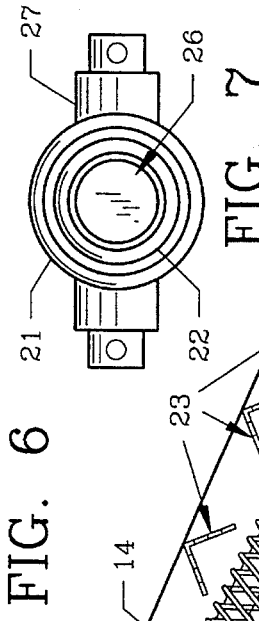

TRAILER RAMP MECHANISM

BACKGROUND OF THE INVENTION

1. Field of the Invention

The invention herein pertains to trailers for hauling wheel or track heavy equipment such as bulldozers, tractors or other vehicles and equipment. Particularly, the invention pertains to ramp mechanisms which are affixed to pivotable ramps at the rear of the trailer to facilitate loading and unloading of the heavy equipment.

2. Description of the Prior Art and Objectives of the Invention various types of ramps have been used with trailers for many years to assist in loading and unloading heavy equipment such as bulldozers, tractors, trucks and other equipment which are transported from one site to another. Pairs of ramps allow the equipment to be driven onto the trailer with relative ease as such ramps are spaced to accommodate the wheel base width of the heavy equipment. Many types of ramps have been used through the years and include ramps which are pivotably attached and ramps which are disattached from the end of the trailer after use. In recent years pivotal ramps have been utilized which have springs of both the torsion and compression types. The springs are used to increase or supplement the manual forces necessary to raise the ramps once the loading or unloading process is complete. For example, single compression coil springs in the past have been placed on guide rods whereby, lowering the ramps which are attached at the rear of the trailer will compress the coil springs. After the equipment is driven up the ramp and onto the trailer, the operator can then raise and pivot the heavy ramps manually with the assistance of the compressed springs which add to the lifting forces. Such springs can provide one-half to two-thirds of the force needed to raise (pivot) the ramps thus making the operator's job much easier and greatly reducing the manual effort required. The raised ramps are then generally secured on the trailer in an upward posture until further needed.

Torsion springs have also been employed which are affixed to the axles of the ramps to apply a twisting force along the axles when the ramps are lowered. Thus, when raising a ramp the lifting force is supplemented with the torsion action of the spring which attempts to return to its relaxed configuration.

Due to the heavy weight of the ramps and the frequency of their use, it is not uncommon for the single coil springs for each ramp to lose their memory and become weakened over a relatively short period of time. Also, there has not been available a suitable ramp mechanism which will allow lateral adjustments of the ramps to accommodate various equipment wheel base widths of different heavy equipment in a convenient manner.

Therefore, with the problems and disadvantages associated with conventional spring loaded trailer ramps, the present invention was conceived and one of its objectives is to provide a ramp mechanism whereby the ramps can be easily laterally adjusted for various wheel or track base widths of heavy equipment vehicles.

It is another objectives of the present invention to provide a ramp mechanism which includes a means to adjust the tension of the coil springs employed.

It is yet another objective of the present invention to provide a coil spring assembly which includes a pair of coil springs on each guide rod for additional resilient force.

Various other objectives and advantages of the present invention will become apparent to those skilled in the art as a more detailed description of the invention is presented below.

SUMMARY OF THE INVENTION

A ramp mechanism which includes a coil spring is attached to a pivotable ramp of a trailer to assist the operator in raising and lowering the ramp as required. The ramp mechanism also includes a guide rod positioned within the coil spring which is rotatably mounted proximate the pivot point of the ramp at the rear of the trailer with the guide rod pivot point below the ramp pivot point and rearwardly thereof to ensure that the coil spring is compressed when the ramp is lowered and which will allow the coil spring to return to its relaxed posture when the ramp is raised after use such as during transportation. A spring stop receives the free end of the guide rod by means of a horizontal slot contained therein. The slot is aligned whereby the ramp can be laterally moved along its axle to accommodate various vehicle wheelbase widths while permitting the spring stop to retain the guide rod. In the event the coil spring requires additional tensioning, a series of apertures are included along the guide rod to allow the proximal end of the coil spring to be positioned as desired to, in effect, shorten or lengthen the coil spring between the aperture and the spring stop. The preferred form of the ramp mechanism includes a pair of concentric coil springs to increase the compression forces for assistance in lifting the ramp.

BRIEF DESCRIPTION OF THE DRAWINGS

FIG. 4 features a sectional side elevational view of the rear portion of the trailer with a ramp in a downward position as seen in FIG. 1;

FIG. 5 illustrates the ramp mechanism and spring stop removed from the ramp to better show the components thereof;

FIG. 6 demonstrates an end view of the spring stop as seen along line 6—6 of FIG. 5 to depict the horizontal slot and guide rod within;

FIG. 7 depicts an enlarged view of the guide rods and coil springs along line 7—7 of FIG. 5, and FIG. 8 pictures an enlarged view of a portion of the guide rods and proximal ends of the coil springs.

DESCRIPTION OF THE PREFERRED EMBODIMENT AND OPERATION OF THE INVENTION

Figure 1:
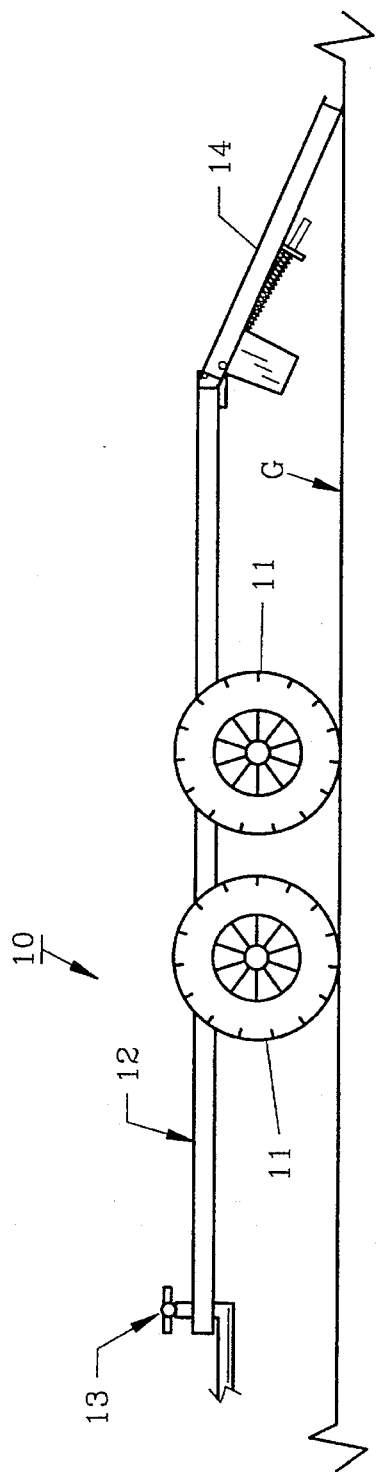
FIG. 1 illustrates a conventional flat heavy equipment trailer with the ramp mechanism of the invention attached thereto with the ramps in a downward posture for loading heavy equipment.
Figure 2:
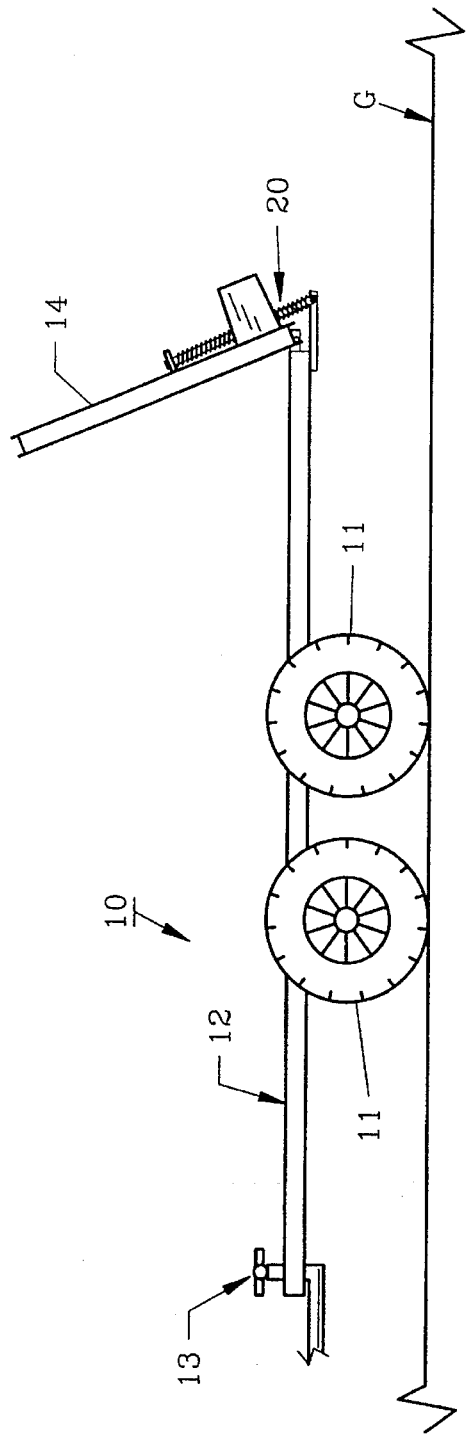
FIG. 2 demonstrates the trailer and ramps as seen in FIG. 1 with the ramps in a raised posture as when hauling the trailer on the road.

Turning now to the drawings, FIG. 1 shows a conventional trailer 10 having wheels 11 and a relatively flat bed 12 which can be joined to a tractor or truck (not shown) by usual hitch mechanism 13. Trailer 10 includes a pair of ramps 14, 14' as better seen in FIG. 3. FIG. 1 demonstrates ramp 14 in a downward posture for loading heavy equipment such as a bulldozer (not shown) which may be nearby on ground G. In FIG. 2 ramp 14 is seen in an upward or raised posture as would be so positioned when hauling trailer 10 along the road. Ramp mechanism 20, the preferred form, allows ramps 14 and 14' to be easily raised as supplemental force is provided by coil springs 21 and 22 which are compressed when the ramps are lowered and which return to a relaxed configuration as the ramps are raised. Coil spring 21 consists of a steel spring formed from 5/16 inch wire with a 3/4 inch pitch and with a diameter of 1 3/4 inch inside. Coil spring 22 is formed from 1/4 inch wire and may have an outside diameter of 1 1/2 inches to fit concentrically within coil spring 21. Coil spring 22 may have a pitch of 1 1/2 inches and is approximately one half the length of coil spring 21 as will be described in more detail below.

Figure 3:
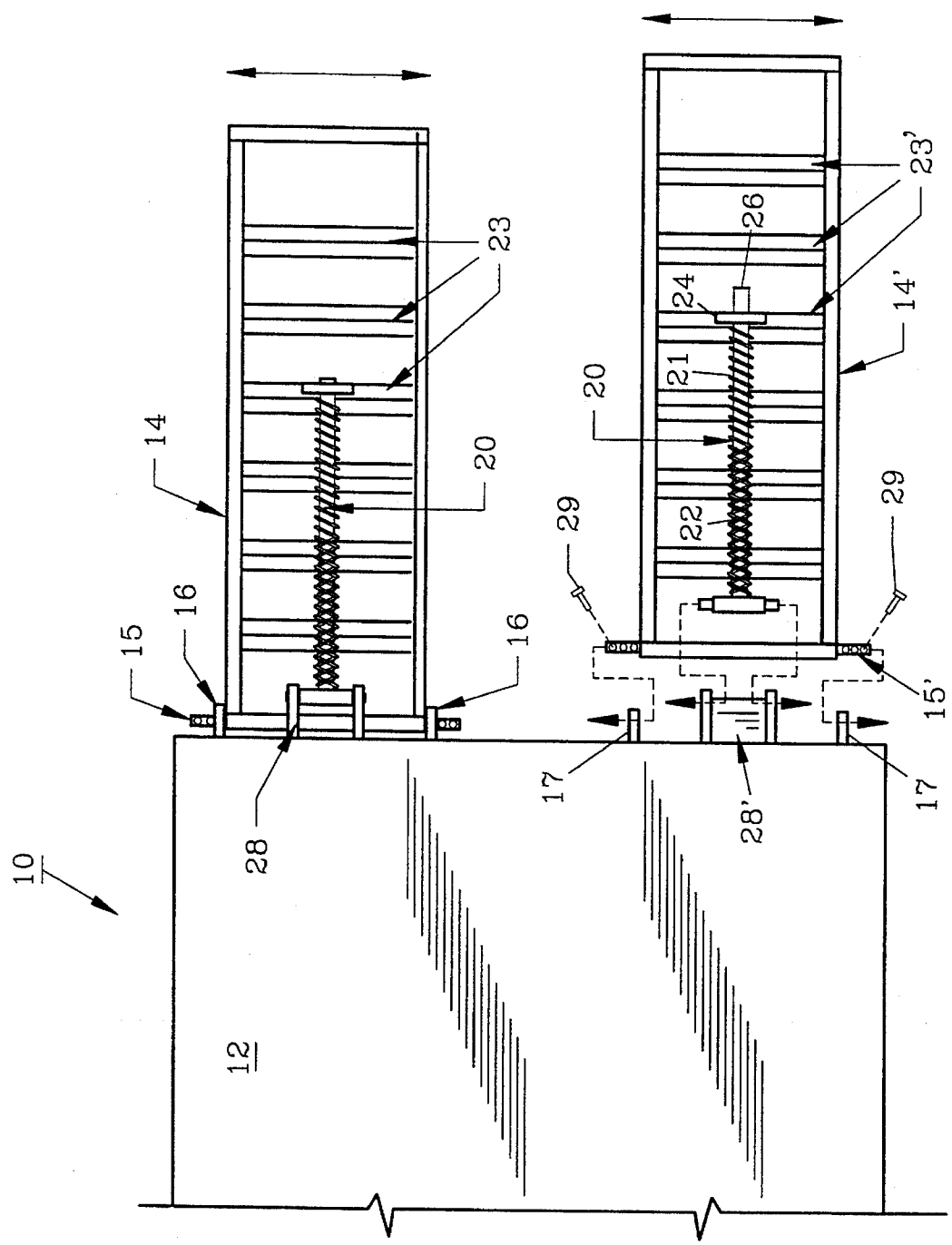
FIG. 3 shows a bottom plan view of the rear portion of the trailer with the one ramp removed for clarity.

As further shown in FIG. 3, ramps 14, 14' are formed from steel frames and treads 23 and include ramp axles 15, 15' for positioning in axle brackets 16, 17 respectively. Axles 15, 15' are wider than ramps 4, 14' to allow said ramps to slide laterally therealong. This lateral movement of ramps 14, 14' on axles 15, 15' respectively, permits various heavy equipment having different width wheel bases to be driven onto trailer 10 easily and safely. Since ramps 14, 14' are allowed to be set laterally as needed, spring stop 24 as shown in FIG. 6 includes a horizontal slot 25 for receiving guide rod 26. Thus, as seen in FIG. 3, spring stop 24 which is affixed such as by welding underneath of ramp 14 to ramp tread 23, will allow guide rod 26 to remain therein as ramp 14' is moved along axle 15' and will provide a stop for distal ends 31', 32' of coil springs 21, 22 respectively thereagainst as guide rod 26 moves through slot 25 during raising and lowering of ramp 14'. Threaded pins 29 or the like are used to selectively secure axles 15, 15' within axle brackets 16, 17 as shown.

As further seen in FIG. 5, guide rod 26 is rigidly attached to guide rod axle 27 which is pivotally positioned in guide rod brackets 28, 28' as also seen in FIG. 3. In FIG. 8, proximal ends 31, 32 of respectively, coil springs 21, 22, have pin rings 30, 33 (33 not seen beneath pin ring 30) affixed thereto for selective securement to guide rod 26 by spring pin 35 which can be inserted through pin rings 30, 33 and into desired aperture 38 along guide rod 26. Apertures 38 are spaced at approximate 1 1/2 inch intervals and allow for the longitudinal adjustment of springs 21, 22 for greater or less compression forces of springs 21, 22 as required. Nut 36 is tightened on the end of threaded spring pin 35 to maintain pin 35 in place therealong.

In operation, trailer 10 is driven to a desired location and with ramps 14, 14' lowered, as seen in FIG. 4, bulldozers or other heavy equipment can be driven onto trailer 10. Next, the operator can manually grasp the end of ramp 14 and, with the assistance of compressed springs 21, 22 ramp 14 can be easily, manually lifted and thereafter secured as required for hauling purposes. Ramp 14' is lifted in the same manner. In the event the bulldozer has a narrow track base, ramps 14, 14' can be slid inwardly along their respective axles 15, 15' for a more narrow spacing. In the event coil springs 21, 22 become weakened due to frequent usage, pins 35 can be removed from aperture 38 on each guide rod 26 and pin rings 30, 33 repositioned at a new aperture 38 closer to spring stop 24 where such movement, in effect, shortens the length of springs 21, 22 and provides greater spring forces for lifting ramps 14, 14'.

The lowering of ramps 14, 14' causes first outer springs 21 and then internal springs 22 to compress as ramps 14, 14' are lowered. Thus, the greatest compression force are present when ramps 14, 14' are lowered as seen in FIG. 1. Such force is reduced as ramps 14, 14' rotate into their raised positions. An alternate embodiment of the invention may have only one coil spring for each guide rod.

The examples and illustrations herein are for explanatory purposes and are not intended to limit the scope of the appended claims.

I claim:

1. A ramp mechanism comprising:

a ramp which is elongated in a longitudinal direction;

a guide rod which is elongated in said longitudinal direction;

a first coil spring, said rod positioned within said first coil spring;

a spring stop fixed relative to said ramp, said spring stop defining a transverse horizontal slot, said transverse slot substantially perpendicular to said longitudinal direction, said guide rod movably positioned within said slot, said slot having a length greater than the diameter of said guide rod, thereby allowing said guide rod to move horizontally within said slot when said ramp is moved horizontally.

2. The ramp mechanism of claim 1 wherein said guide rod defines a plurality of guide rod apertures therealong, said apertures for use in adjusting the tension of said first coil spring.

3. The ramp mechanism of claim 2 and further comprising a spring pin, said spring pin for selective placement in said guide rod apertures.

4. The ramp mechanism of claim 1 wherein said spring stop comprises a metal plate.

5. The ramp mechanism of claim 1 and including a second coil spring, said second coil spring positioned on said guide rod.

6. The ramp mechanism of claim 5 wherein said second coil spring is concentrically positioned relative to said first coil spring.

7. The ramp mechanism of claim 5 wherein said second coil spring has a diameter less than the diameter of said first coil spring.

8. The ramp mechanism of claim 5 wherein said second coil spring has a length less than the length of said first coil spring.

9. A trailer including a ramp and a ramp mechanism attached to said trailer, said ramp being pivotable from a raised to a lowered posture, said ramp mechanism comprising: a guide rod which is longitudinally elongated; a first coil spring, said first coil spring positioned on said guide rod, a spring stop fixed relative to said ramp, said spring stop defining a slot which is transversely elongated, one end of said guide rod pivotally mounted to said trailer and the other end positioned within said slot so as to be freely moveable in a transverse direction within said slot, said first coil spring having a distal end for contact with said spring stop, and a proximal end, said proximal end affixed to said guide rod whereby said first coil spring assists in lifting said ramp from a lowered to a raised posture.

10. The ramp mechanism of claim 9 and further comprising a second coil spring, said second coil spring concentrically aligned with said first coil spring on said guide rod.

11. The ramp mechanism of claim 9 wherein said guide rod defines a plurality of apertures therealong, said apertures for selective placement of said proximal end of said first coil spring.

* * * * *